(12) United States Patent
Saviers et al.

(10) Patent No.: US 11,876,405 B2
(45) Date of Patent: Jan. 16, 2024

(54) ELECTRIC MOTOR WITH COOLING CHANNELS

(71) Applicant: HAMILTON SUNDSTRAND CORPORATION, Charlotte, NC (US)

(72) Inventors: Kimberly Rae Saviers, Glastonbury, CT (US); Ram Ranjan, West Hartford, CT (US); Jagadeesh Kumar Tangudu, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 144 days.

(21) Appl. No.: 16/742,688

(22) Filed: Jan. 14, 2020

(65) Prior Publication Data
US 2021/0218297 A1 Jul. 15, 2021

(51) Int. Cl.
| | |
|---|---|
| H02K 1/20 | (2006.01) |
| H02K 1/14 | (2006.01) |
| H02K 15/02 | (2006.01) |
| H02K 9/19 | (2006.01) |
| H02K 9/197 | (2006.01) |
| H02K 3/24 | (2006.01) |

(52) U.S. Cl.
CPC .............. *H02K 1/20* (2013.01); *H02K 1/146* (2013.01); *H02K 3/24* (2013.01); *H02K 9/19* (2013.01); *H02K 9/197* (2013.01); *H02K 15/022* (2013.01)

(58) Field of Classification Search
CPC ............ H02K 1/20; H02K 3/24; H02K 5/203; H02K 9/193; H02K 9/19–20
USPC ............................................... 310/54, 58, 59
See application file for complete search history.

(56) References Cited

U.S. PATENT DOCUMENTS

| | | | |
|---|---|---|---|
| 4,418,777 A | 12/1983 | Stockton | |
| 5,859,482 A | 1/1999 | Crowell et al. | |
| 5,939,808 A | 8/1999 | Adames | |
| 6,288,460 B1 | 9/2001 | Fakult et al. | |
| 6,300,693 B1 | 10/2001 | Poag et al. | |
| 6,633,097 B2 | 10/2003 | Dunlap et al. | |
| 6,927,509 B2 | 8/2005 | Cichetti, Sr. | |
| 7,309,931 B2 | 12/2007 | Hoppe | |
| 7,476,993 B2 | 1/2009 | Dooley et al. | |

(Continued)

FOREIGN PATENT DOCUMENTS

| | | | |
|---|---|---|---|
| CN | 109361277 A | * | 2/2019 |
| WO | 9917422 A1 | | 4/1999 |

(Continued)

*Primary Examiner* — Quyen P Leung
*Assistant Examiner* — Minki Chang
(74) *Attorney, Agent, or Firm* — CANTOR COLBURN LLP (57) ABSTRACT

A stator of an electric motor includes a stator core including a rim and a plurality of stator teeth extending from the rim. The plurality of stator teeth define a plurality of tooth gaps between circumferentially adjacent stator teeth. A plurality of stator windings are wrapped along the plurality of stator teeth. The plurality of stator windings include a plurality of core segments extending along the plurality of tooth gaps, and a plurality of end turn segments connecting adjacent core segments. A plurality of non-electrically conductive cooling channels are located in the stator core. The plurality of cooling channels are configured to direct a cooling fluid flow therethrough to cool the plurality of stator windings.

14 Claims, 6 Drawing Sheets

(56) References Cited

U.S. PATENT DOCUMENTS

| | | |
|---|---|---|
| 7,675,209 B2 | 3/2010 | Masoudipour et al. |
| 8,093,770 B1 | 1/2012 | Berhan |
| 8,456,044 B2 | 6/2013 | Creviston |
| 8,492,952 B2 | 7/2013 | Bradfield |
| 8,803,381 B2 | 8/2014 | Epres et al. |
| 8,922,072 B2 | 12/2014 | Bott et al. |
| 9,531,239 B2 | 12/2016 | Maschke et al. |
| 9,729,020 B2 | 8/2017 | Pal |
| 10,211,704 B2 | 2/2019 | Tremelling et al. |
| 10,536,055 B2 * | 1/2020 | Hanumalagutti ........ H02K 3/24 |
| 2004/0100154 A1 | 5/2004 | Rahman et al. |
| 2007/0075595 A1 | 4/2007 | Narayanan et al. |
| 2013/0187492 A1 | 7/2013 | Woolmer |
| 2015/0091398 A1 | 4/2015 | Bradfield |
| 2016/0190878 A1 | 6/2016 | Saari et al. |
| 2017/0346370 A1 | 11/2017 | Sentis et al. |
| 2018/0367011 A1 | 12/2018 | Bodla et al. |
| 2019/0207439 A1 | 7/2019 | Marino |
| 2019/0207457 A1 * | 7/2019 | Hamiti ................... H02K 5/203 |
| 2020/0227965 A1 * | 7/2020 | Huber ..................... H02K 1/20 |

FOREIGN PATENT DOCUMENTS

| | | |
|---|---|---|
| WO | 2019171318 A1 | 9/2019 |
| WO | 2019183657 A1 | 10/2019 |
| WO | 2019197048 A1 | 10/2019 |

* cited by examiner

ELECTRIC MOTOR WITH COOLING CHANNELS

BACKGROUND

The present disclosure relates to an electric motor, and more particularly, to a stator assembly that can cool an electric motor.

Traditional electric motors may include a stator, a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in motor jacket. Both of these solutions undesirably add volume to the motor, due to the addition of the jacket.

BRIEF DESCRIPTION

In one embodiment, a stator of an electric motor includes a stator core including a rim and a plurality of stator teeth extending from the rim. The plurality of stator teeth define a plurality of tooth gaps between circumferentially adjacent stator teeth. A plurality of stator windings are wrapped along the plurality of stator teeth. The plurality of stator windings include a plurality of core segments extending along the plurality of tooth gaps, and a plurality of end turn segments connecting adjacent core segments. A plurality of non-electrically conductive cooling channels are located in the stator core. The plurality of cooling channels are configured to direct a cooling fluid flow therethrough to cool the plurality of stator windings.

Additionally or alternatively, in this or other embodiments the plurality of cooling channels extend through one or more of the plurality of tooth gaps or the plurality of stator teeth.

Additionally or alternatively, in this or other embodiments the plurality of non-electrically conductive cooling channels are formed from a polymeric material.

Additionally or alternatively, in this or other embodiments an inlet header is located at a first axial end of the stator including a fluid inlet. The inlet header is fluidly connected to the plurality of cooling channels to direct the cooling fluid flow from the fluid inlet to the plurality of cooling channels. An outlet header is located at a second axial end of the stator opposite the first axial end and includes a fluid outlet. The outlet header is fluidly connected to the plurality of cooling channels to direct the cooling fluid flow from the plurality of cooling channels to the fluid outlet.

Additionally or alternatively, in this or other embodiments one or more of the inlet header or the outlet header is conformally shaped to the plurality of end turn segments to cool the plurality of end turn segments.

Additionally or alternatively, in this or other embodiments the fluid inlet is circumferentially offset from the fluid outlet.

Additionally or alternatively, in this or other embodiments the plurality of cooling channels are located between circumferentially adjacent core segments in the plurality of tooth gaps.

In another embodiment, an electric motor includes a rotor rotatable about a rotation axis, and a stator located radially outboard of the rotor defining a radial air gap between the rotor and the stator. The stator includes a stator core including a rim and a plurality of stator teeth extending from the rim. The plurality of stator teeth define a plurality of tooth gaps between circumferentially adjacent stator teeth. A plurality of stator windings are wrapped along the plurality of stator teeth. The plurality of stator windings include a plurality of core segments extending along the plurality of tooth gaps, and a plurality of end turn segments connecting adjacent core segments. A plurality of non-electrically conductive cooling channels are located in the stator core. The plurality of cooling channels are configured to direct a cooling fluid flow therethrough to cool the plurality of stator windings.

Additionally or alternatively, in this or other embodiments the plurality of cooling channels extend through one or more of the plurality of tooth gaps or the plurality of stator teeth.

Additionally or alternatively, in this or other embodiments the plurality of non-electrically conductive cooling channels are formed from a polymeric material.

Additionally or alternatively, in this or other embodiments an inlet header is located at a first axial end of the stator including a fluid inlet. The inlet header is fluidly connected to the plurality of cooling channels to direct the cooling fluid flow from the fluid inlet to the plurality of cooling channels. An outlet header is located at a second axial end of the stator opposite the first axial end including a fluid outlet. The outlet header is fluidly connected to the plurality of cooling channels to direct the cooling fluid flow from the plurality of cooling channels to the fluid outlet.

Additionally or alternatively, in this or other embodiments one or more of the inlet header or the outlet header is conformally shaped to the plurality of end turn segments to cool the plurality of end turn segments.

Additionally or alternatively, in this or other embodiments the fluid inlet is circumferentially offset from the fluid outlet.

Additionally or alternatively, in this or other embodiments the plurality of cooling channels are located between circumferentially adjacent core segments in the plurality of tooth gaps.

In yet another embodiment, a method of forming a stator of an electric motor includes installing a plurality of stator windings to a stator core, the stator core including a plurality of core teeth defining a plurality of tooth gaps therebetween. A plurality of non-electrically conductive cooling channels are installed in the plurality of tooth gaps. The cooling channels are configured to direct a cooling fluid flow therethrough to cool the plurality of stator windings.

Additionally or alternatively, in this or other embodiments an inlet header including a fluid inlet is secured to the plurality of cooling channels at a first axial end of the stator, and an outlet header including a fluid outlet is secured to the plurality of cooling channels at a first axial end of the stator.

Additionally or alternatively, in this or other embodiments the inlet header and/or the outlet header is secured to the plurality of cooling channels via an epoxy material.

Additionally or alternatively, in this or other embodiments the fluid inlet is positioned circumferentially offset from the fluid outlet.

Additionally or alternatively, in this or other embodiments one or more of the plurality of cooling channels, the inlet header or the outlet header are formed by one or more additive manufacturing processes.

Additionally or alternatively, in this or other embodiments one of the inlet header or the outlet header are formed together with the plurality of cooling channels prior to installation of the plurality of cooling channels into the stator core.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
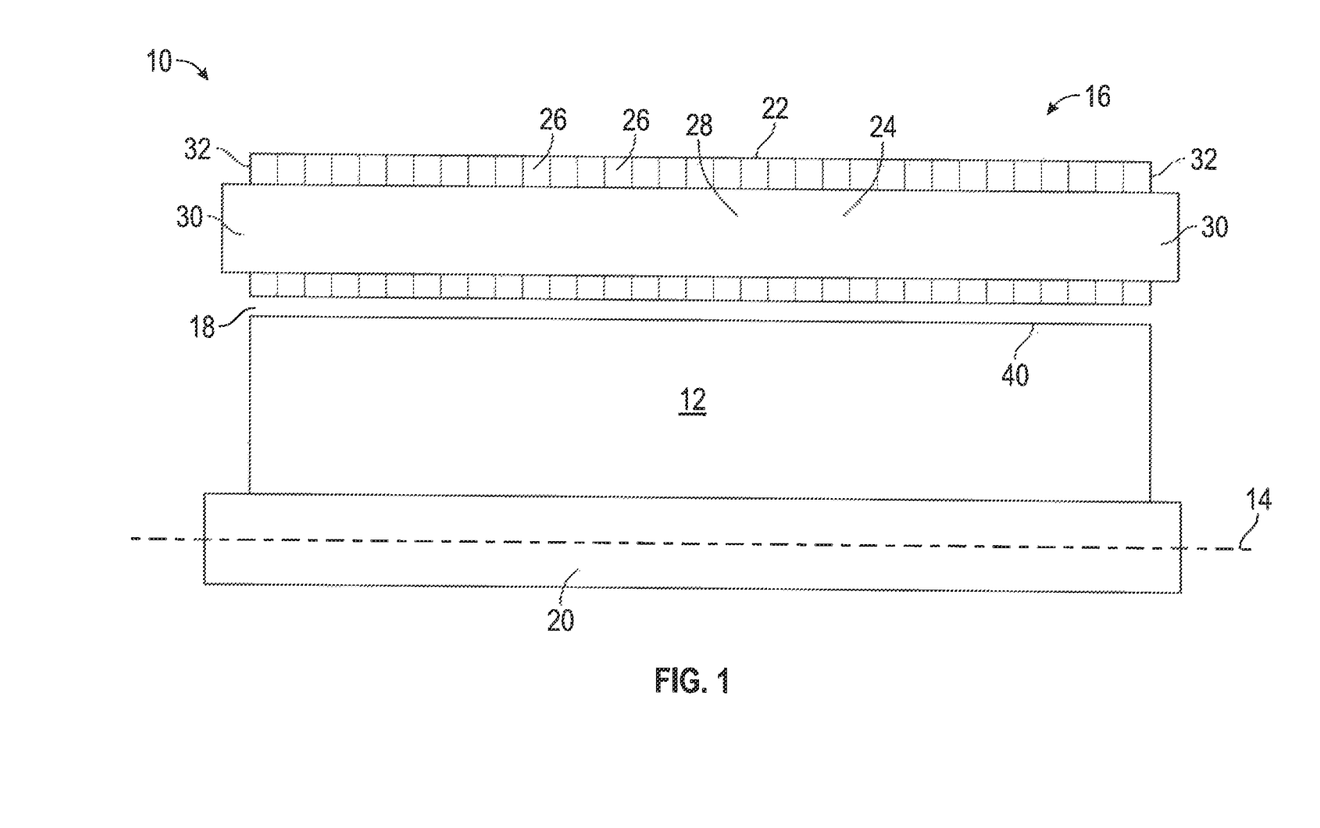
FIG. 1 is a partial view of an embodiment of electric motor.

Referring to FIG. 1, an embodiment of an electric motor 10 is illustrated as one. The electric motor 10 includes a rotor 12 configured to rotate about a rotation axis 14. A stator 16 is located radially outboard of the rotor 12 relative to the rotation axis 14, with a radial air gap 18 located between the rotor 12 and the stator 14. In some embodiments, the rotor 12 is mounted on a shaft 20. The rotor 12 and the shaft 20 may be fixed together such that the rotor 12 and the shaft 20 rotate about the rotation axis 14 together as one piece.

The stator 16 includes a stator core 22 in which a plurality of electrically conductive stator windings 24 are disposed. In some embodiments, such as shown in FIG. 1, the stator core 22 is formed from a plurality of axially stacked laminations 26, which are stacked along the rotation axis 14. In some embodiments, the laminations 26 are formed from a steel material, but one skilled in the art will readily appreciate that other materials may be utilized. The stator winding 24 include core segments 28 extending through the stator core 22 and end turn segments 30 extending from each axial stator end 32 of the stator core 22 and connecting circumferentially adjacent core segments 28. When the stator windings 24 are energized via an electrical current therethrough, the resulting field drives rotation of the rotor 12 about the rotation axis 14.

Figure 2:
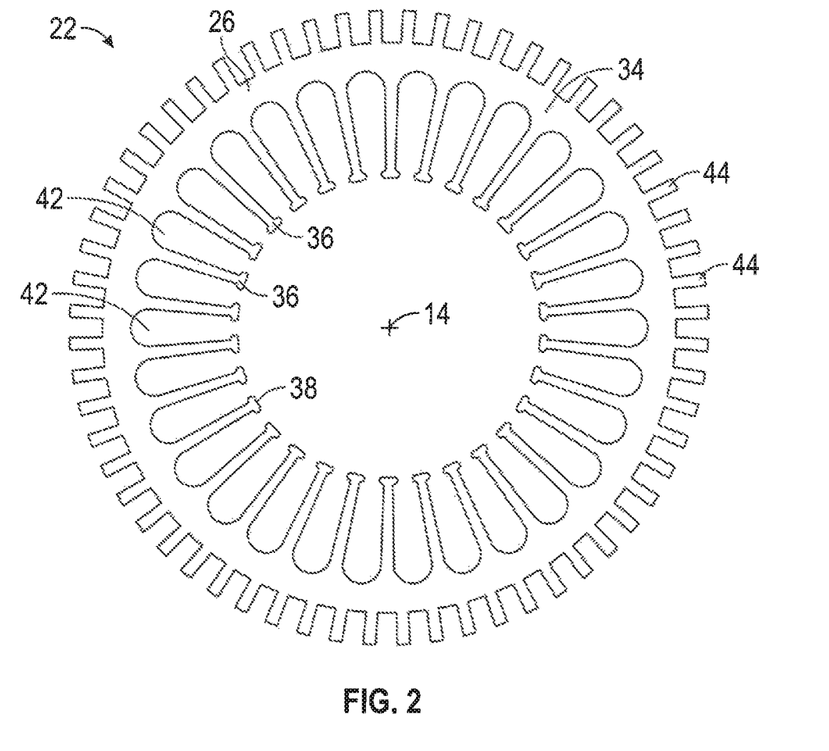
FIG. 2 is a cross-sectional view of an embodiment of a stator core.
Figure 3A:
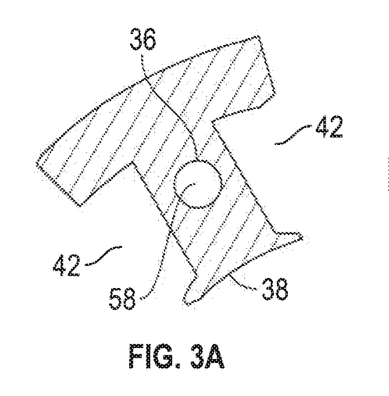
FIGS. 3a and 3b schematically illustrate installation of a stator winding to a stator core.
Figure 3B:
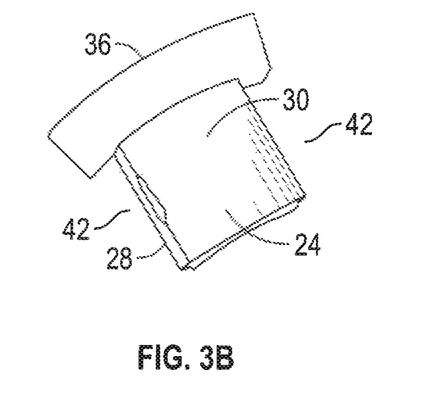

Referring now to FIG. 2, shown is an axial cross-sectional view of the stator core 22. Each lamination 26 of the stator core 22 includes a radially outer rim 34 with a plurality of stator teeth 36 extending radially inwardly from the outer rim 34 toward the rotation axis 14. Each of the stator teeth 36 terminate at a tooth tip 38, which, together with a rotor outer surface 40 (shown in FIG. 1) of the rotor 12, may define the radial air gap 18. Circumferentially adjacent stator teeth 36 define an axially-extending tooth gap 42 therebetween. Further, in some embodiments, a plurality of stator fins 44 extend radially outwardly from the outer rim 34. Referring to FIGS. 3a and 3b, stator windings 24 are installed to the stator core 22 by wrapping the stator windings 24 on the stator teeth 36. In some embodiments, an insulation layer 60 is applied to the stator core 22 prior to installation of the stator windings 24. The wrapping of the stator windings 24 over the stator teeth 36 defines the core segments 28 extending through the stator core 22 along the tooth gaps 42, and further defines the end turn segments 30 of the stator windings 24 at each axial stator end 32. The stator windings 24 are configured such that two core segments 28 occupy each tooth gap 42.

Figure 4:
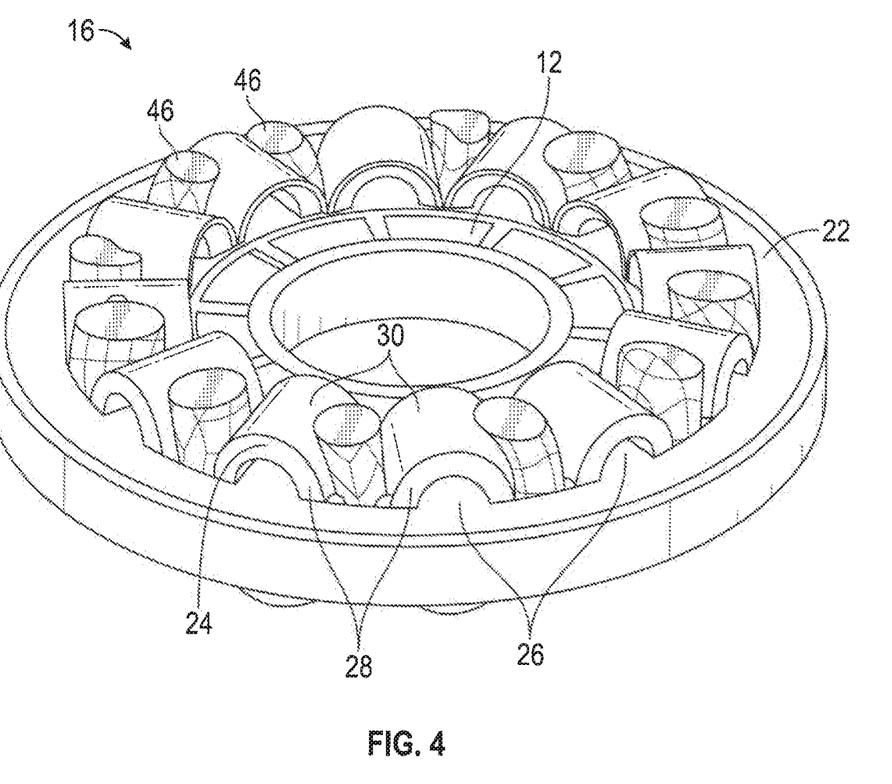
FIG. 4 is a partial perspective view of an embodiment of a stator.

Referring now to the perspective view of the stator 16 in FIG. 4, to enhance cooling of the stator 16, a plurality of cooling channels 46 extend axially through the stator 16 in the tooth gaps 42 between circumferentially adjacent stator teeth 36, and further between circumferentially adjacent core segments 28 of the stator winding 24 located in the tooth gap 42. A cooling fluid flow, schematically shown as 48, is directed through the cooling channels 46 to more directly and more efficiently cool the stator windings 24. In some embodiments, the plurality of cooling channels 46 contact the plurality of stator windings 24. In further embodiments, the cooling channels 46 are multiple cooling channels 46 distributed throughout the stator windings 24. While in the embodiment of FIG. 4, cooling channels 46 are included in each tooth gap 42, in other embodiments other arrangements may be utilized depending on the cooling needs of the stator 16. For example, in other embodiments tooth gaps 42 having cooling channels 46 and tooth gaps 42 without cooling channels may alternate circumferentially around the stator 16. Further, cooling channel cross-sectional area of the cooling channels 46 may vary around the circumference of the stator 16, and likewise cross-sectional areas of the cooling channels 46 may vary axially along their length.

Figure 5:
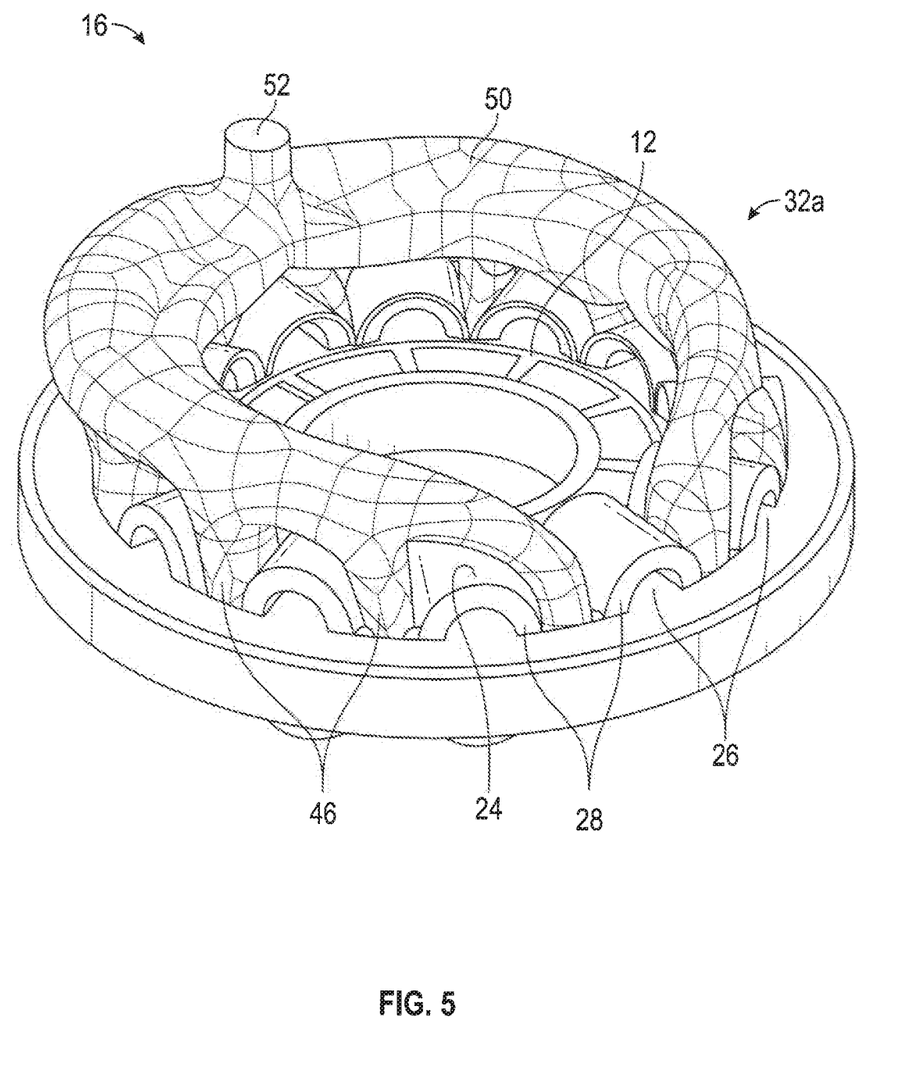
FIG. 5 is another partial perspective view of an embodiment of a stator.
Figure 6:
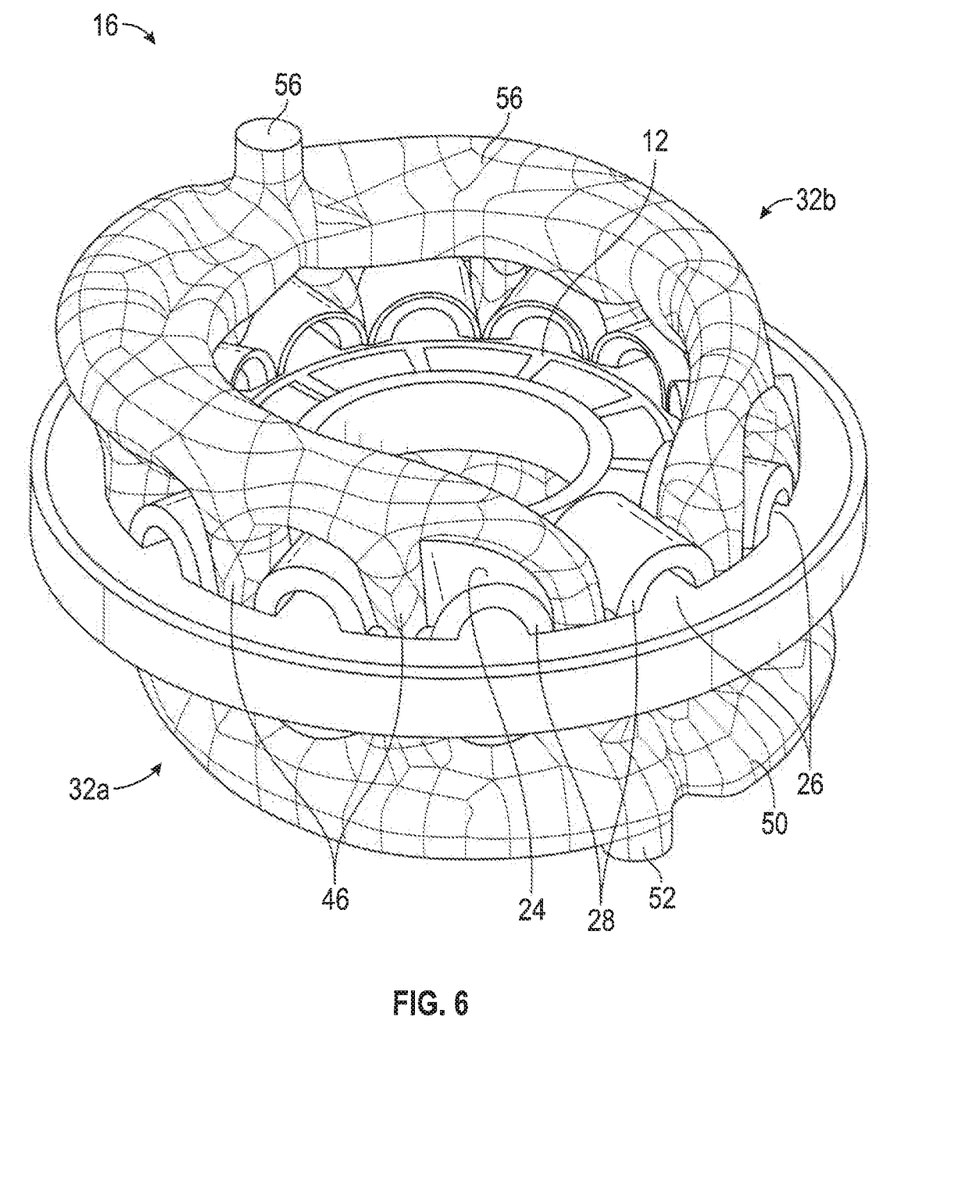
FIG. 6 is yet another partial perspective view of an embodiment of a stator.

Referring now to FIG. 5, the plurality of cooling channels 46 are connected to an inlet header 50 located at a first axial stator end 32a. The inlet header 50 includes a fluid inlet 52 to receive the cooling fluid flow 48 and distribute the cooling fluid flow 48 to the plurality of cooling channels 46. Referring now to FIG. 6, the plurality of cooling channels 46 are connected to an outlet header 54 located at a second axial stator end 18b, opposite the first axial stator end 18a. The outlet header 54 collects the cooling fluid flow 48 from the plurality of cooling channels 46 and directs the cooling fluid flow 48 out of a fluid outlet 56 in the outlet header 54. The inlet header 50 and the outlet header 54 are configured and shaped to provide uniform cooling fluid flow 48 through the plurality of cooling channels 46.

Figure 7:
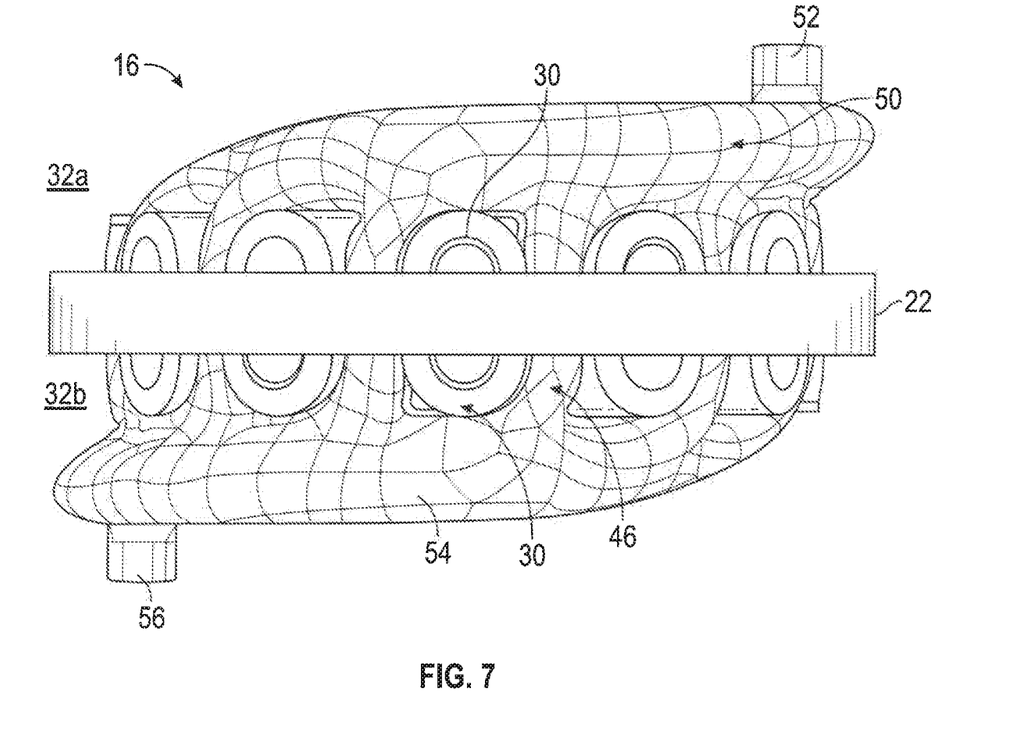
FIG. 7 is an axial side view of an embodiment of a stator.

Referring now to FIG. 7, the inlet header 50 and/or the outlet header 54 may be shaped to conform to the end turn segments 30 of the stator windings 24 to provide additional cooling to the end turn segments 30 via the cooling fluid flow 48 through the inlet header 50 and/or the outlet header 54. Further, the fluid inlet 52 and the fluid outlet 56 may be circumferentially located to improve uniformity of the cooling fluid flow 48 through the plurality of cooling channels 46. In some embodiments, the fluid inlet 52 is circumferentially offset from the fluid outlet 56. For example, in the embodiment illustrated in FIG. 7, the fluid inlet 52 and the fluid outlet 56 are circumferentially located 180 degrees apart.

Referring again to FIG. 3a, in some configurations of stator 16 additional fluid cooling is desired in addition to that provided via cooling channels 46 located in the tooth gaps 42. In such configurations, tooth cooling channels 58 are provided in the stator teeth 36. The tooth cooling channels 58 are similarly connected to the inlet header 50 and the outlet header 54 to provide the cooling fluid flow 48 therethrough. In some embodiments, the plurality of cooling channels 46 extend through the stator core 22 through the plurality of stator teeth 36 and/or through the plurality of tooth gaps 42.

In some embodiments, the cooling channels 46, the inlet header 50 and the outlet header 54 are formed from a non-electrically conductive material, such as a polymer material. Examples of polymer materials that may be utilized in forming of the cooling channels 46 include the commercially available CE 221, EPX 82 and RPU 70. It is to be appreciated that these materials are merely exemplary, and one skilled in the art will readily appreciate that other materials may be utilized in the forming of the cooling channels 46. Further, in some embodiments, the cooling channels 46, the inlet header 50 and the outlet header are formed via one or more additive manufacturing processes.

Figure 8:
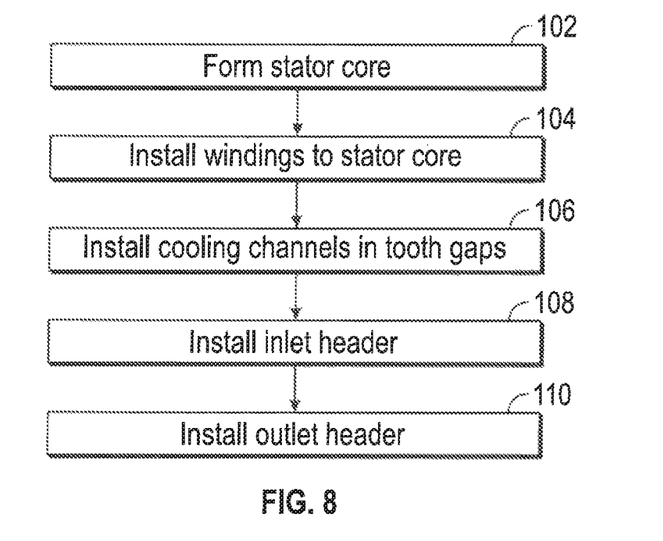
FIG. 8 is a flow chart illustrating an exemplary method of forming a stator.

In FIG. 8, an exemplary method 100 of manufacturing a stator 16 is illustrated. In step 102, the stator core 22 is formed by axially stacking the plurality of laminations 26. In step 104, the stator windings 24 are installed to the stator core 22. After installation of the stator windings 24, the cooling channels 46 are installed in the stator core 22, for example in the tooth gaps 42 between circumferentially adjacent core segments 28 and/or through the stator teeth 36 at step 106. The inlet header 50 in installed to the plurality of cooling channels 46 at step 108. Similarly, at step 110 the outlet header 54 is installed to the plurality of cooling channels 46. In some embodiments, the inlet header 50 or the outlet header 54 may be assembled to the plurality of cooling channels 46 prior to installation of the cooling channels into the stator core 22. In some embodiments and epoxy adhesive is utilized to secure the inlet header 50 and the outlet header 54 to the plurality of cooling channels 46. In still other embodiments, the inlet header 50 or the outlet header 54 may be formed as a single unitary component with the plurality of cooling channels 56. One skilled in the art will readily appreciate, however, that other securing means may be utilized.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A stator of an electric motor comprising:
   a stator core including:
      a rim; and
      a plurality of stator teeth extending from the rim, the plurality of stator teeth defining a plurality of tooth gaps between circumferentially adjacent stator teeth;
   a plurality of stator windings wrapped along the plurality of stator teeth, the plurality of stator windings including:
      a plurality of core segments extending along the plurality of tooth gaps; and
      a plurality of end turn segments connecting adjacent core segments; and
   a plurality of non-electrically conductive cooling channels disposed in the stator core, the plurality of cooling channels configured to direct a cooling fluid flow therethrough to cool the plurality of stator windings;
   wherein the plurality of cooling channels extend through the plurality of stator teeth;
   an inlet header disposed at a first axial end of the stator including a fluid inlet, the inlet header fluidly connected to the plurality of cooling channels to direct the cooling fluid flow from the fluid inlet to the plurality of cooling channels; and
   an outlet header disposed at a second axial end of the stator opposite the first axial end including a fluid outlet, the outlet header fluidly connected to the plurality of cooling channels to direct the cooling fluid flow from the plurality of cooling channels to the fluid outlet;
   wherein one or more of the inlet header or the outlet header are formed from a polymeric material;
   wherein the plurality of end turn segments are curvilinear; and
   wherein one or more of the inlet header or the outlet header is conformally shaped to the curvilinear end turn segments to cool the plurality of end turn segments;
   wherein the plurality of cooling channels and one or more of the inlet header or the outlet header are formed together as a single unitary component;
   wherein the inlet header includes:
      a first header arm extending circumferentially in a first direction from the fluid inlet and terminating at a first arm end; and
      a second header arm extending circumferentially in a second direction opposite the first direction from the fluid inlet and terminating at a second arm end.

2. The stator of claim 1, wherein the plurality of non-electrically conductive cooling channels are formed from a polymeric material.

3. The stator of claim 1, wherein the fluid inlet is circumferentially offset from the fluid outlet.

4. The stator of claim 1, wherein the plurality of cooling channels are located between circumferentially adjacent core segments in the plurality of tooth gaps.

5. An electric motor comprising:
   a rotor rotatable about a rotation axis;
   a stator disposed radially outboard of the rotor defining a radial air gap between the rotor and the stator, the stator including:

a stator core including:
  a rim; and
  a plurality of stator teeth extending from the rim, the plurality of stator teeth defining a plurality of tooth gaps between circumferentially adjacent stator teeth;
a plurality of stator windings wrapped along the plurality of stator teeth, the plurality of stator windings including:
  a plurality of core segments extending along the plurality of tooth gaps; and
  a plurality of end turn segments connecting adjacent core segments; and
a plurality of non-electrically conductive cooling channels disposed in the stator core, the plurality of cooling channels configured to direct a cooling fluid flow therethrough to cool the plurality of stator windings;
wherein the plurality of cooling channels extend through the plurality of stator teeth;
an inlet header disposed at a first axial end of the stator including a fluid inlet, the inlet header fluidly connected to the plurality of cooling channels to direct the cooling fluid flow from the fluid inlet to the plurality of cooling channels; and
an outlet header disposed at a second axial end of the stator opposite the first axial end including a fluid outlet, the outlet header fluidly connected to the plurality of cooling channels to direct the cooling fluid flow from the plurality of cooling channels to the fluid outlet;
wherein one or more of the inlet header or the outlet header are formed from a polymeric material;
wherein the plurality of end turn segments are curvilinear; and
wherein one or more of the inlet header or the outlet header is conformally shaped to the curvilinear end turn segments to cool the plurality of end turn segments;
wherein the plurality of cooling channels and one or more of the inlet header or the outlet header are formed together as a single unitary component;
wherein the inlet header includes:
  a first header arm extending circumferentially in a first direction from the fluid inlet and terminating at a first arm end; and
  a second header arm extending circumferentially in a second direction opposite the first direction from the fluid inlet and terminating at a second arm end.

6. The electric motor of claim 5, wherein the plurality of cooling channels extend through the plurality of tooth gaps.

7. The electric motor of claim 5, wherein the plurality of non-electrically conductive cooling channels are formed from a polymeric material.

8. The electric motor of claim 5, wherein the fluid inlet is circumferentially offset from the fluid outlet.

9. The electric motor of claim 5, wherein the plurality of cooling channels are located between circumferentially adjacent core segments in the plurality of tooth gaps.

10. A method of forming a stator of an electric motor, comprising:
installing a plurality of stator windings to a stator core, the stator core including a plurality of core teeth defining a plurality of tooth gaps therebetween, the plurality of stator windings including:
  a plurality of core segments extending along the plurality of tooth gaps; and
  a plurality of end turn segments connecting adjacent core segments; and
installing a plurality of non-electrically conductive cooling channels through the plurality of core teeth, the cooling channels configured to direct a cooling fluid flow therethrough to cool the plurality of stator windings;
securing an inlet header including a fluid inlet to the plurality of cooling channels at a first axial end of the stator; and
securing an outlet header including a fluid outlet to the plurality of cooling channels at a first axial end of the stator;
wherein one or more of the inlet header or the outlet header are formed from a polymeric material;
wherein the plurality of end turn segments are curvilinear; and
wherein one or more of the inlet header or the outlet header is conformally shaped to the curvilinear end turn segments to cool the plurality of end turn segments;
wherein the plurality of cooling channels and one or more of the inlet header or the outlet header are formed together as a single unitary component;
wherein the inlet header includes:
  a first header arm extending circumferentially in a first direction from the fluid inlet and terminating at a first arm end; and
  a second header arm extending circumferentially in a second direction opposite the first direction from the fluid inlet and terminating at a second arm end.

11. The method of claim 10, further comprising securing the inlet header and/or the outlet header to the plurality of cooling channels via an epoxy material.

12. The method of claim 10, further comprising positioning the fluid inlet circumferentially offset from the fluid outlet.

13. The method of claim 10, further comprising forming one or more of the plurality of cooling channels, the inlet header or the outlet header by one or more additive manufacturing processes.

14. The method of claim 10, further comprising forming one of the inlet header or the outlet header together with the plurality of cooling channels prior to installation of the plurality of cooling channels into the stator core.

* * * * *